United States Patent
McKinion

(10) Patent No.: US 10,119,291 B2
(45) Date of Patent: Nov. 6, 2018

(54) FREE-STANDING LOAD SUPPORT SYSTEM

(71) Applicant: James McKinion, Austin, TX (US)

(72) Inventor: James McKinion, Austin, TX (US)

(*) Notice: Subject to any disclaimer, the term of this patent is extended or adjusted under 35 U.S.C. 154(b) by 0 days.

(21) Appl. No.: 15/436,530

(22) Filed: Feb. 17, 2017

(65) Prior Publication Data

US 2018/0238072 A1 Aug. 23, 2018

(51) Int. Cl.
*E04H 12/18* (2006.01)
*H02S 20/30* (2014.01)

(52) U.S. Cl.
CPC ............. *E04H 12/18* (2013.01); *H02S 20/30* (2014.12)

(58) Field of Classification Search
CPC ................................ E04H 12/18; H02S 20/30
See application file for complete search history.

(56) References Cited

U.S. PATENT DOCUMENTS

| | | | | |
|---|---|---|---|---|
| 4,875,660 A | * | 10/1989 | Gagnon | B66F 7/10 254/1 |
| 4,995,377 A | * | 2/1991 | Eiden | F24J 2/5431 126/605 |
| 5,002,435 A | * | 3/1991 | Dupeuble | E02D 5/385 405/233 |
| 5,066,168 A | * | 11/1991 | Holdeman | E02D 5/56 405/245 |
| 5,088,681 A | * | 2/1992 | Procaccianti | E04H 12/2223 248/156 |
| 5,683,207 A | * | 11/1997 | Mauer | E02D 5/74 405/231 |
| 5,730,117 A | * | 3/1998 | Berger | F24J 2/38 126/600 |
| 5,833,399 A | * | 11/1998 | Bullivant | E02D 5/385 405/233 |

(Continued)

OTHER PUBLICATIONS

Maier et al. "Increasing Lateral Capacity of Helical Piles with Lateral Restraint Devices", Missouri University of Science and Technology, 2010—Fifth International Conference on Recent Advances in Geotechnical Earthquake Engineering and Soil Dynamics, San Diego—May 24-29, 2010 http://scholarsmine.mst.edu/cgi/viewcontent.cgi?article=2661&context=icrageesd.

(Continued)

*Primary Examiner* — James M Ference
(74) *Attorney, Agent, or Firm* — Russell Ng PLLC; Brian F. Russell

(57) ABSTRACT

A load support system includes an elongate support member that includes, toward a first end, a first portion for direct earth burial and further includes, toward a second end, a second portion to which the load can be coupled. A lateral support, mounted about the first portion has a diameter greater than the elongate support member and a length less than the first portion. At least one first helix is formed about the first portion. The load support system may have a load positioning system including a housing that supports attachment of the load. The housing is sized to receive therein a second helix formed about the second portion and includes a follower assembly configured to contact the second helix to impart rotation as the housing is raised and lowered. The load positioning system further includes an actuator configured to telescopically raise and lower the housing.

24 Claims, 8 Drawing Sheets

(56) References Cited

U.S. PATENT DOCUMENTS

| | | | | |
|---|---|---|---|---|
| 5,904,447 | A * | 5/1999 | Sutton | B09C 1/00 175/323 |
| 5,919,005 | A * | 7/1999 | Rupiper | B09C 1/00 175/323 |
| 5,927,905 | A * | 7/1999 | van Halteren | E02D 5/80 405/241 |
| 6,058,930 | A * | 5/2000 | Shingleton | F24J 2/541 126/600 |
| 6,142,712 | A * | 11/2000 | White | E02D 5/40 175/220 |
| 6,386,295 | B1 * | 5/2002 | Suver | E02D 7/18 173/1 |
| 6,399,881 | B2 * | 6/2002 | Edelstein | E04H 12/08 174/45 R |
| 6,552,257 | B1 * | 4/2003 | Hart | F24J 2/541 126/600 |
| 6,652,195 | B2 * | 11/2003 | Vickars | E02D 5/36 175/262 |
| 6,662,801 | B2 * | 12/2003 | Hayden | F24J 2/38 126/571 |
| 6,722,821 | B1 * | 4/2004 | Perko | E02D 5/801 405/249 |
| 6,761,387 | B2 * | 7/2004 | Sloss | B60P 1/02 296/26.05 |
| 6,814,525 | B1 * | 11/2004 | Whitsett | E02D 5/38 405/233 |
| 6,820,379 | B1 * | 11/2004 | Krinner | E04H 12/2223 108/156 |
| 6,824,331 | B2 * | 11/2004 | Parker | E02D 5/801 175/388 |
| 6,942,430 | B1 * | 9/2005 | Suver | E02D 5/56 405/232 |
| 7,004,683 | B1 * | 2/2006 | Rupiper | E02D 5/56 405/229 |
| 7,413,035 | B1 * | 8/2008 | Miller | |
| 7,731,454 | B1 * | 6/2010 | Watson | E02D 5/56 405/231 |
| 7,770,669 | B1 * | 8/2010 | Desrochers | |
| 7,854,451 | B2 * | 12/2010 | Davis, II | E21B 17/046 285/404 |
| 8,052,100 | B2 * | 11/2011 | Zante | H02S 20/30 126/600 |
| 8,371,771 | B1 * | 2/2013 | Lugo | E02D 5/80 405/227 |
| 8,407,950 | B2 * | 4/2013 | Hartelius | F24J 2/5233 52/173.3 |
| 8,602,689 | B1 * | 12/2013 | Van Polen | E02D 7/28 175/23 |
| 8,763,601 | B2 * | 7/2014 | Doyle | F24J 2/10 126/604 |
| 8,863,450 | B2 * | 10/2014 | Anderson | E04H 12/2215 52/117 |
| 9,051,706 | B1 * | 6/2015 | Ludwig | E02D 5/76 |
| 9,068,318 | B1 * | 6/2015 | Gochis | E02D 5/56 |
| 9,231,141 | B2 * | 1/2016 | Kirchner | H02S 20/32 |
| 9,416,512 | B2 * | 8/2016 | Suver | E02D 11/00 |
| 9,422,741 | B1 * | 8/2016 | Conte | E04H 17/22 |
| 2003/0159839 | A1 * | 8/2003 | Perko | E02D 5/56 172/100 |
| 2004/0076479 | A1 * | 4/2004 | Camilleri | E02D 5/56 405/252.1 |
| 2004/0103599 | A1 * | 6/2004 | Keck | E02D 5/801 52/155 |
| 2004/0231257 | A1 * | 11/2004 | Brown | E02D 5/801 52/292 |
| 2005/0097833 | A1 * | 5/2005 | Campbell | H01Q 1/10 52/118 |
| 2006/0127188 | A1 * | 6/2006 | Francis | E02D 5/56 405/231 |
| 2007/0000187 | A1 * | 1/2007 | St Onge | E02D 5/74 52/157 |
| 2007/0231081 | A1 * | 10/2007 | Gantt, Jr. | E02D 5/80 405/244 |
| 2010/0319272 | A1 * | 12/2010 | Kellner | E02D 5/801 52/157 |
| 2011/0099923 | A1 * | 5/2011 | Ventura | F24J 2/523 52/173.3 |
| 2011/0194901 | A1 * | 8/2011 | Jones | E02D 5/56 405/252.1 |
| 2011/0297141 | A1 * | 12/2011 | Correia | F24J 2/055 126/572 |
| 2012/0114425 | A1 * | 5/2012 | Seider | E02D 5/523 405/252.1 |
| 2012/0213597 | A1 * | 8/2012 | Baumsteiger | E02D 5/801 405/252.1 |
| 2013/0160380 | A1 * | 6/2013 | Atchley | E04H 12/2223 52/157 |
| 2014/0283894 | A1 * | 9/2014 | Silver | F24J 2/525 136/246 |
| 2014/0356075 | A1 * | 12/2014 | Hale | E02D 27/16 405/230 |
| 2015/0247336 | A1 * | 9/2015 | Bergman | E04H 12/2223 52/157 |
| 2016/0215519 | A1 * | 7/2016 | Bergman | E04H 12/2261 |

OTHER PUBLICATIONS

Earth Contact Products, ECP Solar Foundation—ECP "One Step" Solar Foundation, pp. 1-2, downloaded Feb. 17, 2017 http://www.getecp.com/.

Terrell Croft, A Reference Book for Practical Electrical Workers, First Edition, Second impression—Corrected, 1914; pp. 329, 331 & 332.

* cited by examiner

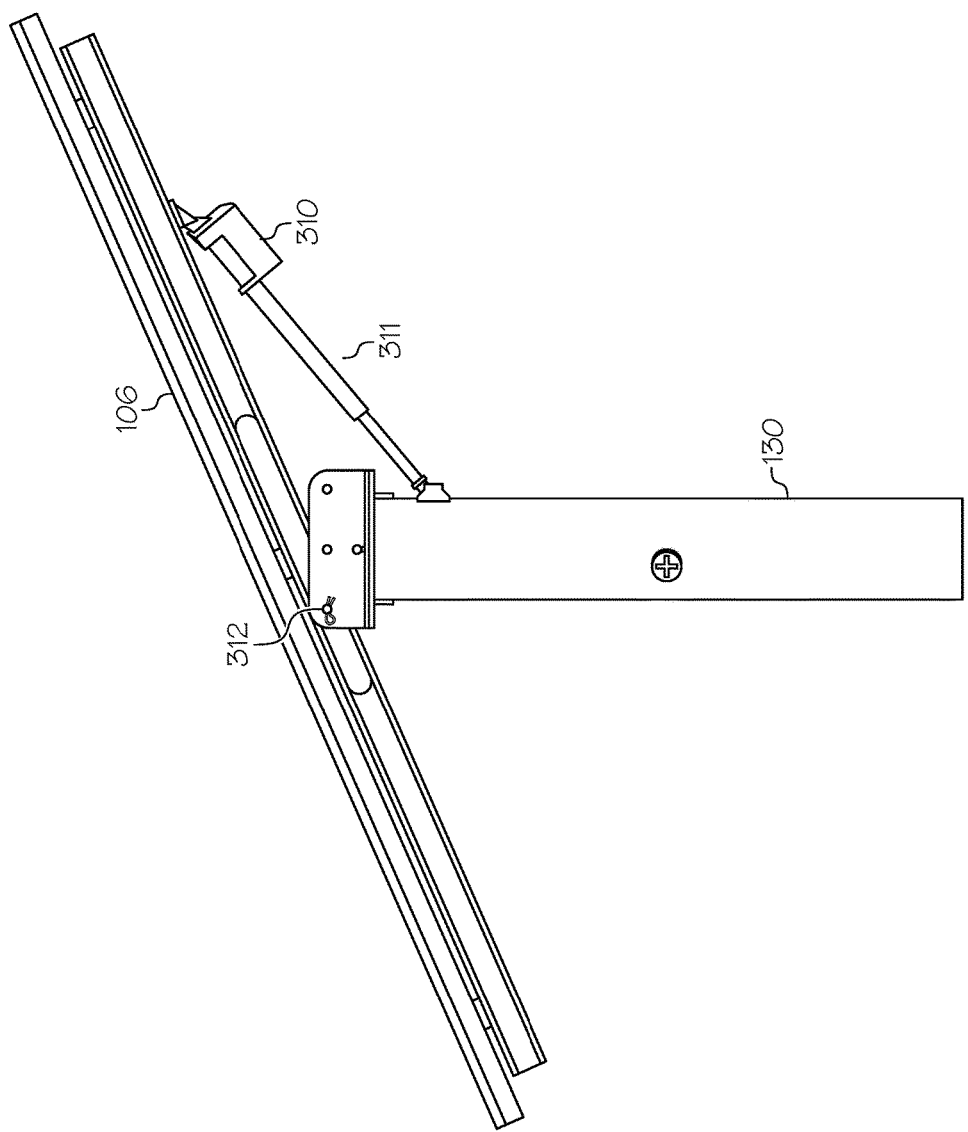

FREE-STANDING LOAD SUPPORT SYSTEM

BACKGROUND OF THE INVENTION

This disclosure relates in general to a free-standing load support system. More particularly, the present disclosure relates to a load support system having a load positioning system that enables a load, for example, a solar panel array, antenna or other load, to be repositioned.

A variety of supports have conventionally been utilized to provide an attachment location for a load. Often, ground-based supports take the form of a substantial steel-reinforced concrete foundation to which a pole is attached by multiple bolts or other anchors. A common example of such a ground-based support is a street light post. Alternatively, a ground-based support may include a multi-member mast, which may optionally be stabilized by one or more guy-wires. A common example of this type of construction is an antenna mast or a utility pole. The present disclosure recognizes that such supports are expensive to install and often require deployment of multiple crews each having only a subset of skills needed to erect the support and/or attach a load to the support.

The present disclosure additionally appreciates that in many cases it would be desirable to be able to reorient or reposition a load attached to a support. Conventional motor-based positioning systems permitting loads mounted on supports to be reoriented or repositioned are generally complex and expensive and require specialized training and tools to install and to service them. The present disclosure recognizes that it would be desirable to provide a motor-based load positioning system that is inexpensive and is relatively easy to install and maintain.

BRIEF SUMMARY

In at least one embodiment, a load support system includes an elongate support member that includes, toward a first end, a first portion for direct earth burial and further includes, toward a second end, a second portion to which the load can be coupled. A lateral support, mounted about the first portion has a diameter greater than the elongate support member and a length less than the first portion. At least one first helix is formed about the first portion. In some embodiments, the load support system may have a load positioning system including a housing that supports attachment of the load. The housing is sized to receive therein a second helix formed about the second portion of the elongate support member and includes a follower assembly configured to contact the second helix to impart rotation as the housing is raised and lowered. The load positioning system further includes an actuator configured to telescopically raise and lower the housing and/or to rotate the load relative to the housing.

BRIEF DESCRIPTION OF THE SEVERAL VIEWS OF THE DRAWINGS

FIGS. 5A-5C illustrate various angles at which a load can be positioned by a load positioning system in accordance with one embodiment.

DETAILED DESCRIPTION

Figure 1:
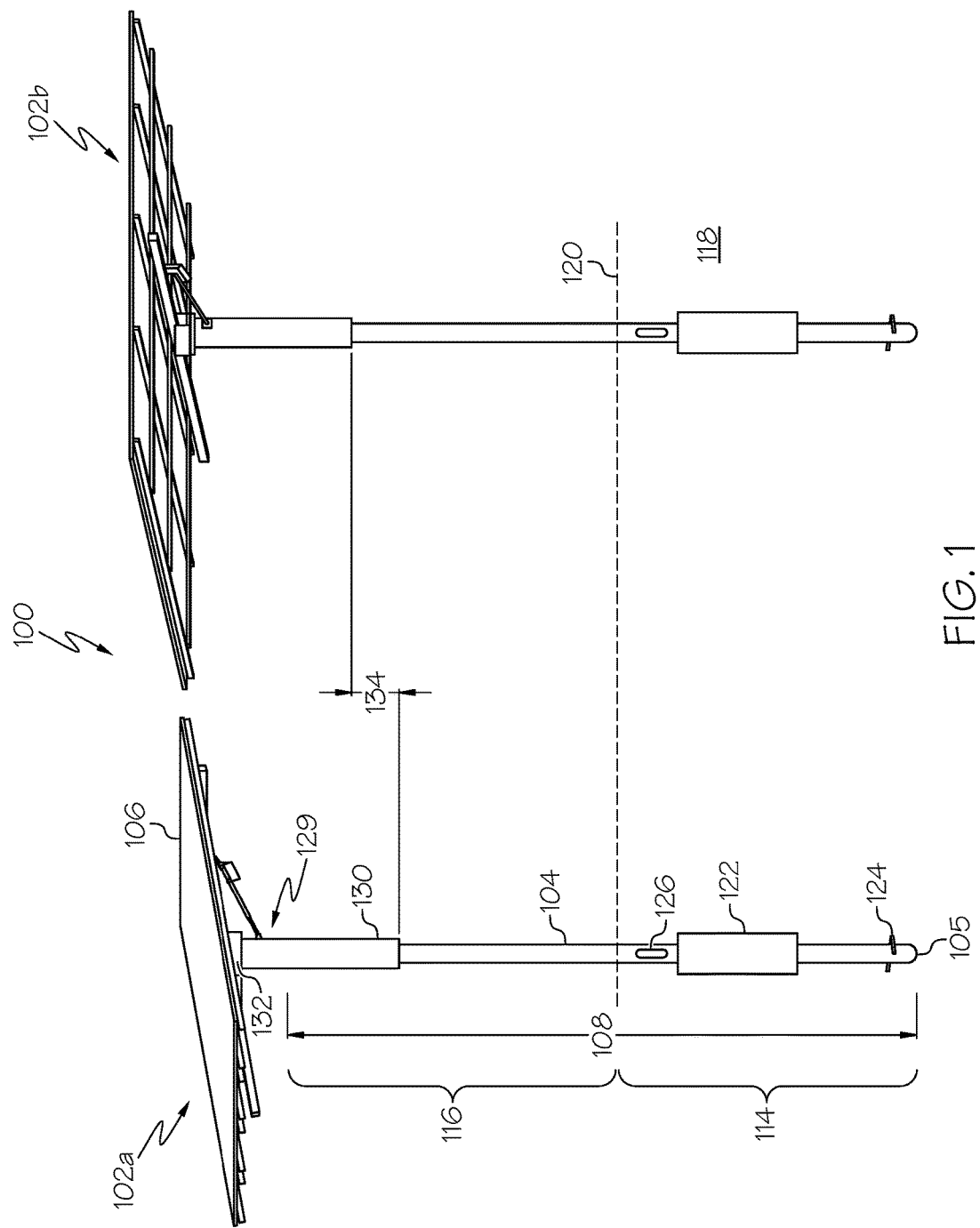
FIG. 1 illustrates an exemplary load support system in accordance with one embodiment.

With reference now to the figures and with particular reference to FIG. 1, there is illustrated an elevation view of an installation site 100 including two load support systems 102a, 102b in accordance with one embodiment.

Load support systems 102a, 102b (each referred to generally as a load support system 102) each include a respective elongate support member 104. In various embodiments, elongate support member 104 may be, for example, a tube, pole or rod, which may be formed, for example, of steel, aluminum (or other metal), wood, concrete, etc. Although it is generally preferred if elongate support member 104 has a round cross-section, members of other cross-sections (e.g., square, pentagonal, hexagonal, octagonal, irregular, etc.) may be used. In one example, elongate support member 104 is a round galvanized steel tube having a hollow interior volume.

Elongate support member 104 can be scaled or adapted to have any of a variety of combinations of length, diameter and sidewall thickness that is desired and/or necessary for a particular application and/or load 106. For example, in the illustrated application in which the load 106 supported by elongate support member 104 is a solar panel array, elongate support member 104 can be formed from galvanized steel pipe having a nominal diameter of 6 inches (e.g., schedule 40 having a 6.625" outer diameter (OD) and 6.065" inner diameter (ID) or schedule 80 having a 6.625" OD and 5.761" ID) and an overall length 108 of about 21 feet. In other applications the dimensions of elongate support member 104 can be varied.

Figure 2B:
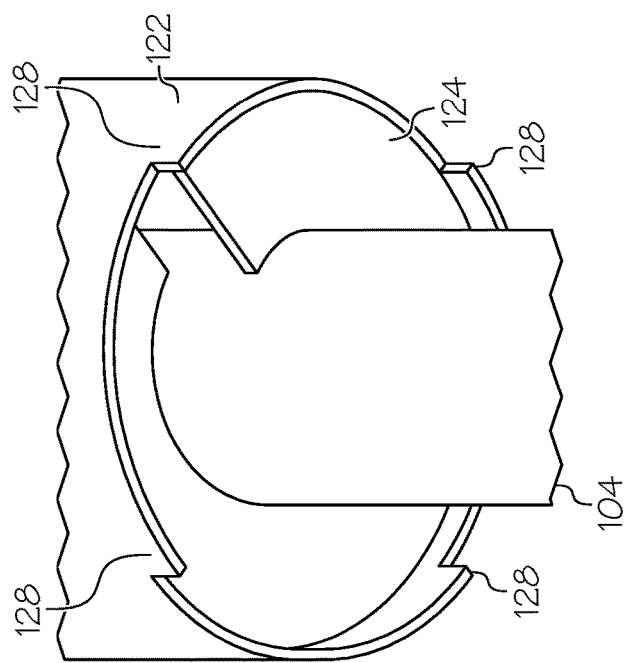
FIG. 2B is a detailed perspective view of a helix in the load support system of FIG. 1.
Figure 2A:
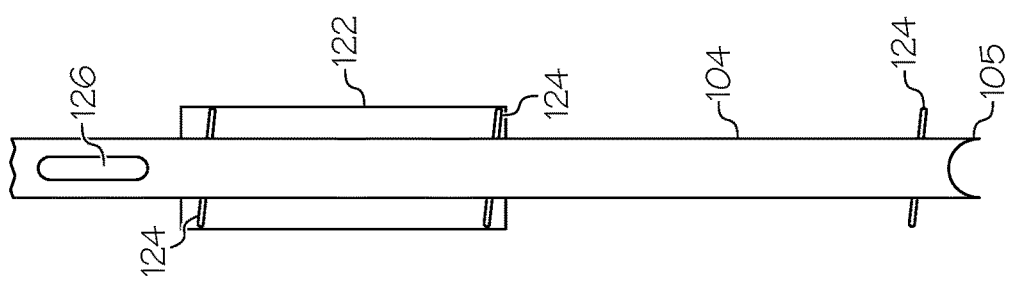
FIG. 2A is a section view of a portion of load support system of FIG. 1.

Elongate support member 104 has a first end 105 and a second end 107 (see FIG. 3) and includes, toward first end 105, a first portion 114, and further includes, toward second end 107, a second portion 116. In the illustrated embodiment, first portion 114 is configured for direct earth burial in the earth 118 below earth surface 120. To this end, first end 105 can optionally be configured with one or more earth-engaging features, such as spade tip(s) or teeth or a screw, as best seen in FIG. 2A. In embodiments in which first portion 114 is configured for direct earth burial, first portion 114 may have a length selected to provide desired anchoring for the load support system 102. The length of first portion 114 (i.e., the depth of embedment of elongate support member 104) may be selected based on one or more factors, such as the soil type, the soil hardness, the weight and dimensions of the load, the width of elongate support member 104, the material selected for elongate support member, etc. Various standards can also be used to determine an appropriate depth of embedment, including standards adopted by the Outdoor Advertising Association of America, Inc. and *Lineman's and Cableman's Handbook, 12th Ed., McGraw Hill*, 2012, as well as local, state and national building codes. For example, in some embodiments, the depth of embedment is determined as 10% of the length 108 of elongate support member 104 plus 2 feet. In other embodiments, the depth of embedment is determined as ⅙ of the length of elongate support member 104. In the illustrated embodiment, the depth of embedment is approximately half of the length 108, for example, about 10 feet if length 108 is 21 feet. It should be appreciated that in other embodiments, first portion 114 may be secured by a technique other than direct earth burial (e.g., attachment to one or more structures above and/or below earth surface 120 (e.g., a concrete foundation)). In these alternative embodiments, the absolute and relative lengths of elongate support member 104 and of first and second portions 114, 116 can, and likely will, vary. Further, although elongate support member 104 is illustrated as installed generally perpendicular to (i.e., at a 90 degree angle with respect to) the immediately surrounding earth surface 120, it should be appreciated that in other implementations and/or applications elongate support member 104 may be installed at a different angle relative to earth surface 120.

In at least embodiments such as that shown in which first portion 114 is intended for direct earth burial, a load support system 102 preferably further includes a lateral support 122 that enhances the lateral stability of load support system 102. As depicted in FIG. 1, lateral support 122 is coupled to first portion 114 and preferably has a length that is less than the length of first portion 114 and a diameter that is greater than that of first portion 114. For example, lateral support 122 may be formed of a length of metal (e.g., galvanized steel or aluminum), plastic (e.g., PVC) or composite tube having a round cross-section. It should be appreciated, however, that members of other cross-sections (e.g., square, pentagonal, hexagonal, octagonal, irregular, etc.) may alternatively be used. In one example, lateral support 122 can be formed from schedule 10 galvanized steel pipe having a nominal diameter of 14 inches (14.00" OD and 13.5" ID) and an overall length between about 36 and 60 inches, and more particularly about 48 inches. In other embodiments, lateral support 122 can have a lesser or greater nominal diameter (e.g., about 10 inches, about 16 inches, about 20 inches, about 24 inches, about 30 inches, about 36 inches or about 48 inches). In at least some embodiments, lateral support 122 is positioned along elongate support member 104 so that the top (trailing) edge of lateral support 122 will be at least 2 feet below earth surface 120 when first portion 114 is fully buried. Burial of lateral support 122 at least two feet below earth surface 120 increases available soil friction and permits use of cable vias, such as through holes 126 (described below) for routing power and control lines. For example, in some embodiments, it is desirable if through holes 126 are at least 18 inches below surface 120 in order to satisfy the minimum burial depth for nonmetallic direct burial raceways per the National Electric Code (NEC).

In at least embodiments in which first portion 114 is intended for direct earth burial, load support system 102 preferably further includes at least one helix 124 formed about the first portion 114 of elongate support member 104. As shown in the section view given in FIG. 2A, in one preferred embodiment, load support system 102 includes at least one helix 124 that is intermediate lateral support 122 and first end 105 and is preferably near (e.g., with 1 foot of) first end 105. One or more additional helices 124 may be utilized to couple lateral support 122 to elongate support member 104, as shown in FIG. 2A and also in the detailed perspective view given in FIG. 2B. In at least one exemplary embodiment, helices 124 may all be identical and have the same left hand or right hand thread. In at least one exemplary embodiment, helices 124 may be formed, for example, of ⅜ inch thick steel and have a 3 inch pitch right hand thread. In some embodiments, one or more of helices 124 may have a lesser or greater pitch, for example, 6 inches, and/or a lesser or greater diameter and/or a different radial extent (e.g., 300 degrees rather than 360 degrees). In various embodiments, one or more of helices 124 may also have a beveled cutting edge rather than a blunt cutting edge as shown in FIG. 2B. The helix or helices 124 facilitate installation of first portion 114 by cutting through earth 118 and further increase the resistance of load support system 102 to compression and tension forces.

In the embodiment shown in FIG. 2A, lateral support 122 is hollow, which enables lateral support 122 to collect spoils during installation and thus increase the mass of load support system 102 below ground surface 120. In other embodiments, lateral support 122 can instead be sealed, at least at its leading edge. In such an embodiment, installation of first portion 114 of elongate support member 104 may be facilitated by implementing a spoil-displacing screw about elongate support member 104 at or below the leading (lower) edge of lateral support 122.

In the embodiments shown in FIGS. 2A-2B, first portion 114 may be installed in earth 118, for example, utilizing a conventional utility derrick pole truck, excavator or skid-steer loader having a rotary drive or a similar towable or machine-mounted apparatus. To install first portion 114 in earth 118, first end 105 of elongate support member 104 is placed in contact with the surface 120 at a desired installation location, and the elongate support member 104 is rotated by the machine until a desired burial depth is achieved. Rotary cutting of earth 118 can be facilitated not only by the configuration of first end 105 and one or more helices 124 noted above, but also one or more teeth 128 optionally formed on the leading edge of lateral support 124 (see, FIG. 2B). Handling of elongate support member 104 as well as filling of the void within elongate support member 104 (e.g., by earth 118 and/or another ballast such as concrete) is facilitated by one or more optional through holes 126 in the sidewall of elongate support member 104. In some embodiments, through hole(s) 126 also provide access to the interior of elongate support member 104 for one or more unillustrated power and/or control lines.

Although elongate support member 104 is generally illustrated in the figures as a unitary member, it should be appreciated that in some embodiments, elongate support member 104 can instead be formed by coupling two or more members. For example, in one embodiment, first portion 114 and second portion 116 are separable, and second portion 116 can be coupled to first portion 114 (e.g., by welding and/or a collar or other fixture and/or fasteners (e.g., breakaway bolts)), for example, following installation of first portion 114.

Returning to FIG. 1, in some embodiments, a load can be coupled directly to second portion 116 of elongate support member 104. In other embodiments, such as that shown in FIG. 1, load 106 can be mechanically coupled indirectly to elongate support member 104 via one or more intermediate member(s), such as fixture(s), frame(s), support(s), and/or housing(s). In the example given in FIG. 1, load support system 102 includes a load positioning system 129 that couples load 106 to elongate support member 104 and enables load 106 to be selectively positioned and repositioned with respect to elongate support member 104. Load positioning system 129 includes a housing 130 and a fixture 132 that supports attachment (e.g., pivotal attachment) of load 106. Housing 130 has an interior volume sized to receive therein at least some of the second portion 116 of elongate support member 104. For example, in one particular embodiment, housing 130 can be formed of a 63 inch length of schedule 10 galvanized steel pipe having a nominal diameter of 10.75 inches (10.75" OD and 10.42" ID) or 14 inches. As described further below with reference to FIG. 3, in at least some preferred embodiments, housing 130 can be translated with reference to elongate support member 104 by one or more hydraulic, pneumatic or electrical actuators. In the illustrated example, housing 130 can be translated along elongate support member 104 from its retracted position represented by the position of load support system 102a to its extended position represented by the position of load support system 102b. The translational range 134 of housing 130 can vary widely between embodiments, but in the depicted example is about 2 feet (e.g., 19 inches). As also described below with reference to FIG. 3, in at least some preferred embodiments, housing 130 can be rotated with reference to elongate support member 104 by one or more actuators. In the illustrated example, housing 130 can be rotated about elongate support member 104 from the retracted position represented by load support system 102a to the extended position represented by load support system 102b. The rotational range of motion of housing 130 can vary widely between embodiments, but in the depicted example is about 420 degrees.

Figure 3:
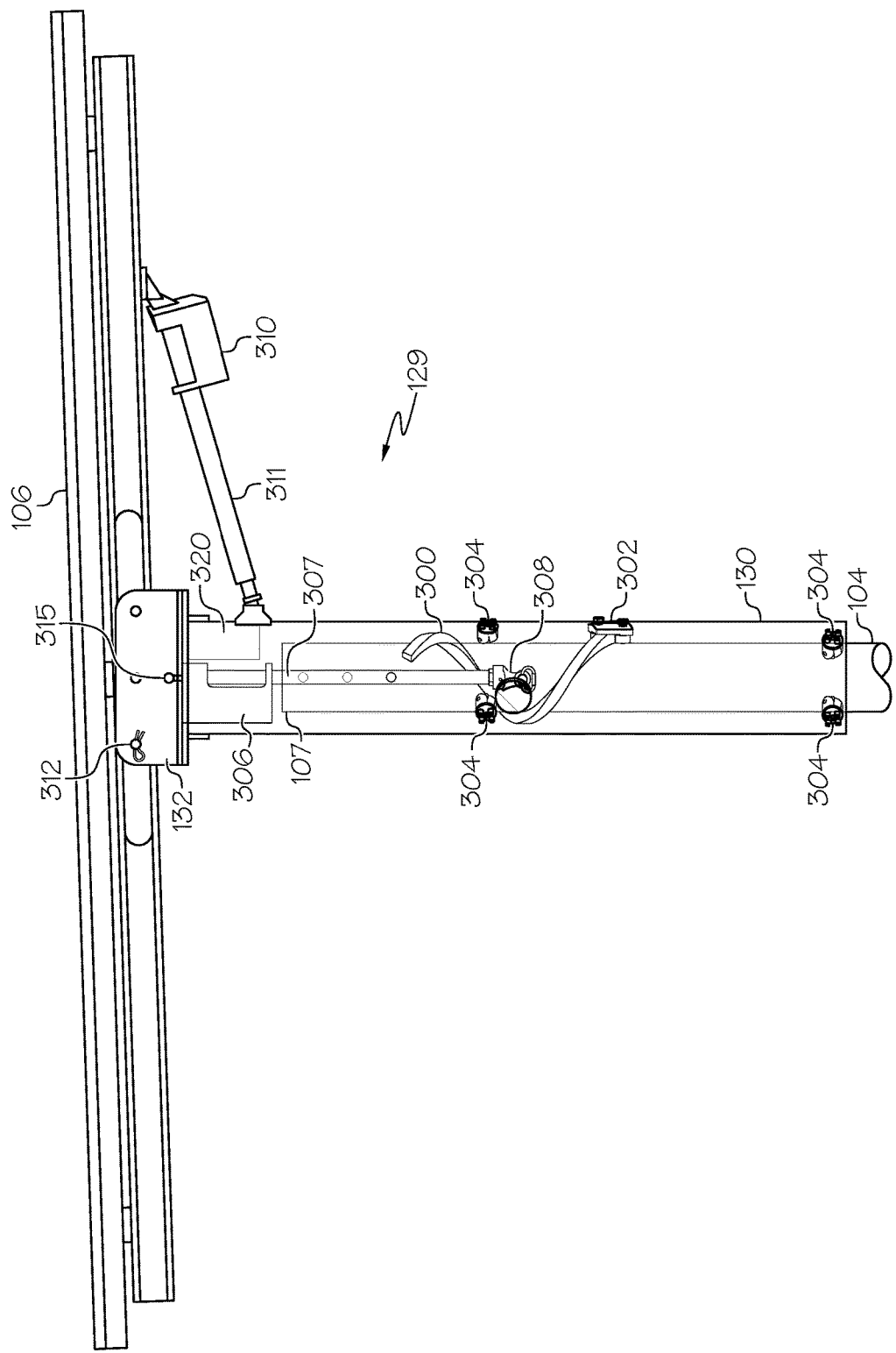
FIG. 3 is a more detailed view of the load positioning system of FIG. 1.

With reference now to FIG. 3, there is illustrated a more detailed view of load positioning system 129 of FIG. 1 in accordance with one embodiment. For ease of understanding, some of the elements depicted in FIG. 3 are illustrated transparently.

In the illustrated embodiment, a helix 300 is formed about second portion 116 of elongate support member 104. Helix 300 preferably has a greater pitch than helices 124 and may also have a greater length and greater strength. For example, in one embodiment, helix 300 may be formed of steel bar that is between 1.5 and 2 feet (e.g., 21 inches) long, 1 inch wide, and 1 inch thick and have a pitch between 15 and 20 inches, and more particularly, about 17 inches (e.g., 16.8 inches). Utilizing these exemplary dimensions, the total length of helix 300 provides a track having about 450 degrees of rotation, including 420 degrees of expected rotation of housing 130 and 15 degrees of buffer at either end of the travel path.

In the illustrated embodiment, helix 300 has a left hand thread, which imparts a clockwise rotation to housing 130. This arrangement is useful for solar-tracking applications in the Northern Hemisphere, as housing 130 would be in its lowest position at sunrise and then generally turn southerly and westerly (and translate upwardly) as the sun advances toward sunset. Of course, in other applications, such as solar-tracking in the Southern Hemisphere, a helix 300 having a right hand thread, which imparts a counter-clockwise rotation to housing 130 can alternatively be used. It should also be appreciated that in some embodiments, housing 130 may be initialized to its highest position by default and may thereafter be lowered utilizing either a left hand or right hand thread.

Figure 4A:
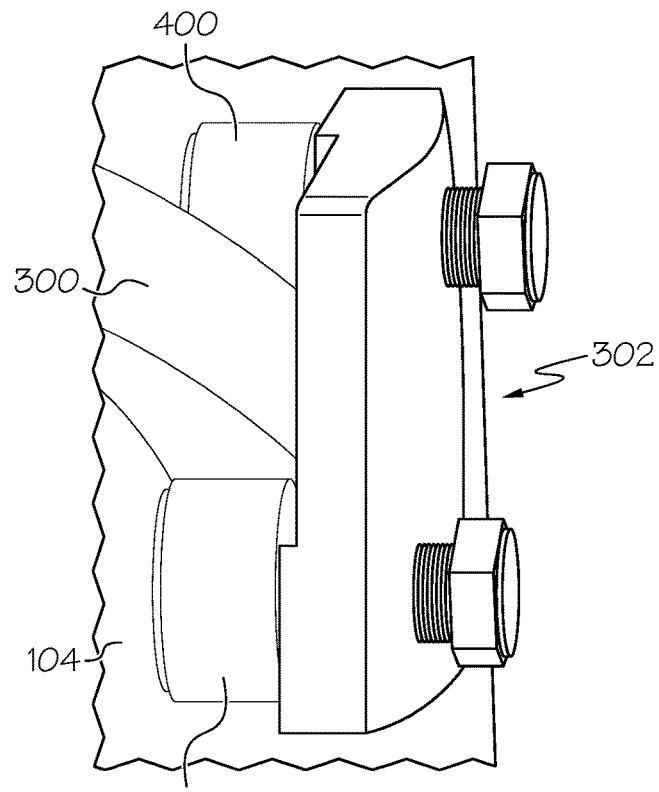
FIG. 4A is a more detailed view of a follower assembly of the load positioning system in accordance with one embodiment.

Housing 130 includes a follower assembly 302 configured to contact helix 300 and thus impart rotation to housing 130 as housing 130 is raised and lowered relative to elongate support member 104. In the illustrated example, which is shown in greater detail in FIG. 4A, follower assembly 302 includes two rollers 400 disposed on opposing sides of helix 300. It is presently preferred if only a single helix 300 and single follower assembly 302 are implemented, as this design allows looser tolerances and reduces and/or eliminates the possibility that an additional follower assembly 302 will bind on its corresponding helix 300. However, it should be appreciated, that other embodiments (e.g., those supporting loads of greater mass) may include multiple follower assemblies 302 and/or multiple helices 300. As further illustrated in FIG. 3, housing 130 may include one or more additional roller assemblies 304 to maintain the radial spacing between the interior surface of housing 130 and the exterior surface of elongate support member 104.

Figure 4B:
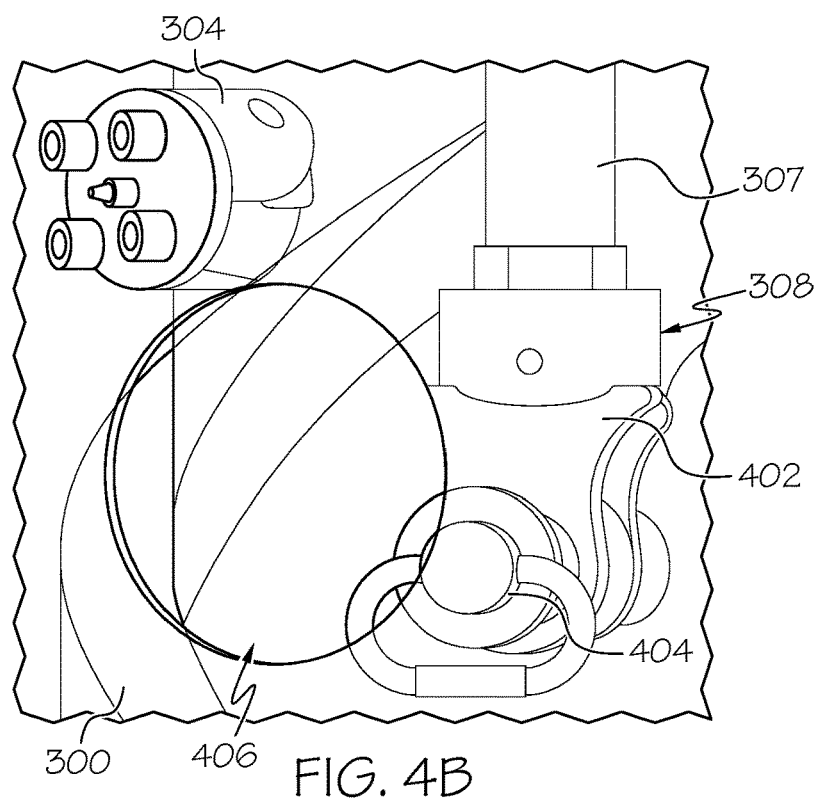
FIG. 4B is a more detailed view of a pin and yoke assembly of the load positioning system in accordance with one embodiment.

Housing 130 additionally houses one or more hydraulic, pneumatic or electric actuators to reposition load 106. In the depicted embodiment, housing 130 houses an electric linear actuator 306 coupled to a pin 315 that couples housing 130 to fixture 132. A rod 307 of linear actuator 306 is further rotatably coupled to elongate support member 104 by a pin and yoke assembly 308 best seen in the detailed view given in FIG. 4B. As shown in FIG. 4B, an installer can couple rotatable yoke 402 to elongate support member 104 by inserting a pin 404 through elongate support member 104 and rotatable yoke 402 via a port 406 in the sidewall of housing 130. Port 406 may optionally be closed, for example, by a removable and reinstallable plastic or metal cap (as specifically illustrated in FIGS. 5A-5C). With this arrangement, when linear actuator 306 is energized via an unillustrated power supply line, linear actuator 306 telescopically raises and lowers housing 130 relative to elongate support member 104 while simultaneously rotating housing 130 about elongate support member 104 under the urging of follower assembly 302.

In the embodiment of load positioning system 129 depicted in FIG. 3, load positioning system 129 optionally but preferably further includes a second hydraulic, pneumatic, or electric actuator, for example, electric linear actuator 310. In at least some embodiments, linear actuators 306 and 310 can be interchangeable and/or identical. In the example shown in FIG. 3, linear actuator 310 is pivotally coupled to load 106 and includes a rod 311 that is pivotally coupled to housing 130 (e.g., via a bolt-mounted bracket). Consequently, when linear actuator 310 is energized via an unillustrated power supply line, rod 311 is extended, causing load 106 to pivot about pivot pin 312 that couples load 106 to fixture 132.

Figure 5A:
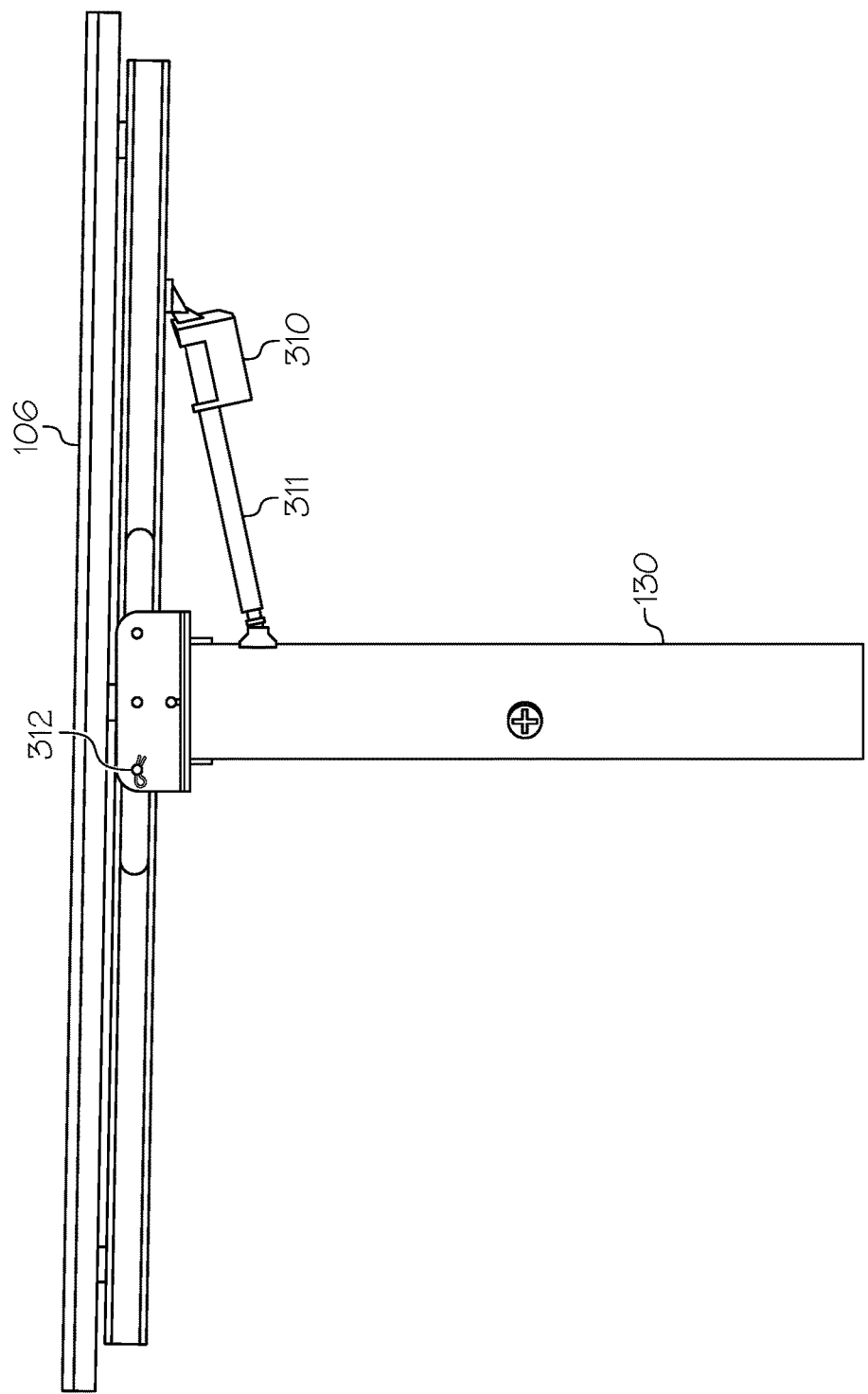
Figure 5C:
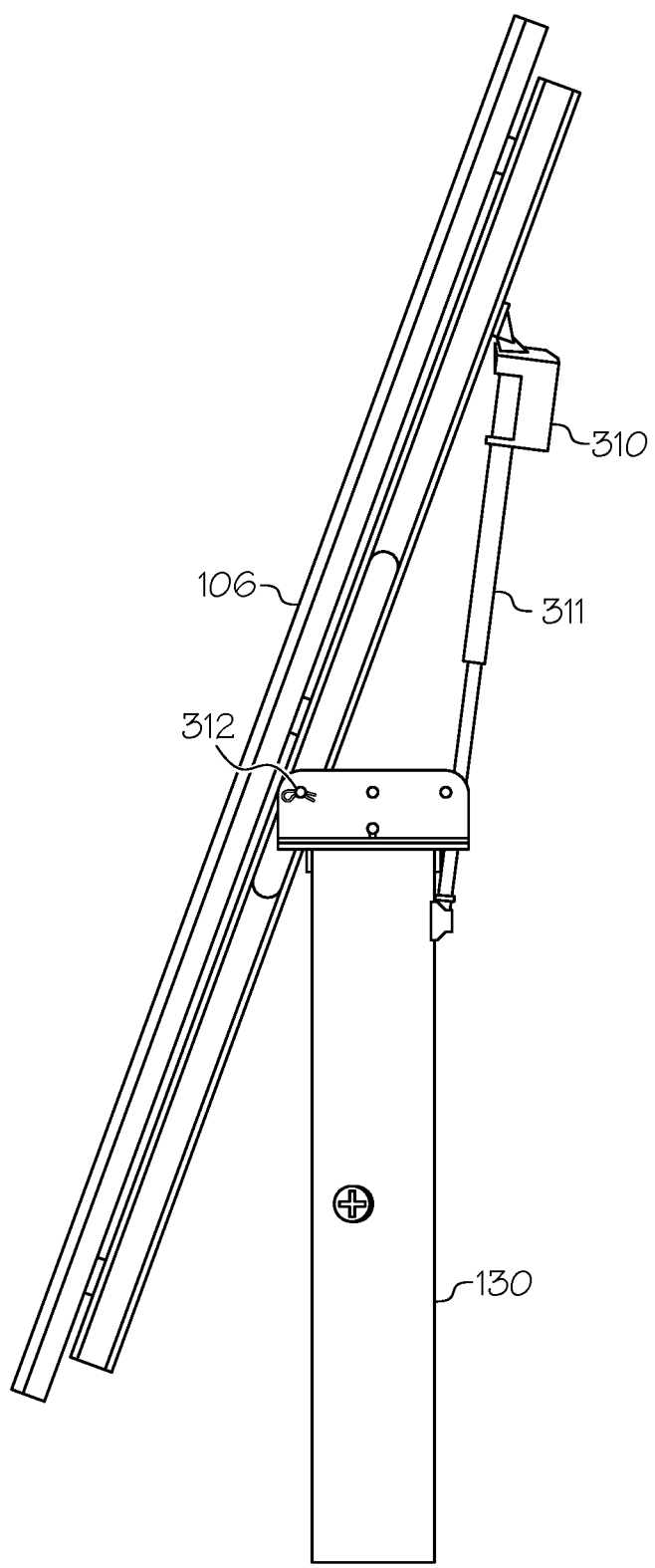

The range of motion of load 106 provided by linear actuator 310 is depicted in FIGS. 5A-5C. In FIG. 5A, rod 311 of linear actuator 310 is in its fully retracted position, and load 106 is approximately orthogonal to the long axis of housing 130, having a slightly negative angle of between 1 and 5 degrees. In FIG. 5B, rod 311 is extended halfway, and load 106 has about a 30 degree angle with respect to the long axis of housing 130. In FIG. 5C, rod 311 is fully extended, and load 106 has approximately a 70 degree angle with respect to the long axis of housing 130.

In embodiments including one or more hydraulic, pneumatic or electric actuators, it is preferred if load support system 102 has a controller that provides automated control of the actuator(s). In some embodiments, each load support system 102 (or even each actuator) may have its own respective controller. In other embodiments, one controller may control multiple load support systems 102. Further, in some embodiments, the controller may be entirely local to the installation site of the load support system(s) controlled by the controller. In other embodiments, the controller may be remote from the installation site of the load support system(s). In yet other embodiments, the controller may be implemented in a distributed fashion, for example, with one portion of the controller implemented locally at the installation site and another portion of the controller implemented remotely or with multiple portions at different locations at the installation site. In various embodiments, the controller may be implemented entirely in hardware (e.g., with integrated circuitry such as an ASIC, PLA, or FPGA) or with a combination of program code (e.g., software and/or firmware) and hardware (e.g., a processor or microcontroller). In some embodiments, a portion of the controller referred to herein as a control unit 320 (which may include the complete controller or only a subset of the controller) may be included within load positioning system 129 to energize (e.g., via hydraulic or pneumatic pressure or electrical current) one or more actuators, as shown in FIG. 3. In these embodiments, control unit 320 may be disposed internal or external to housing 130 and may further be partially or fully incorporated into one or more actuators 306, 310.

As will be appreciated, the control functions provided by the controller can vary widely between differing embodiments and for differing loads. For example, if load 106 is a solar panel array as depicted in the figures, the controller may control actuators 306, 310 so that the solar panel array tracks the position of the sun during the daylight hours and returns to the position illustrated in FIG. 5A during the night. The controller may also control actuators 306, 310 to place the solar panel array in a predetermined default position or a dynamically determined position in response to certain input(s). For example, if an input is received indicating a high wind condition, the controller may control actuators 306, 310 to reduce the wind-induced loading on a load support system 102 by placing the solar panel array in the default position depicted in FIG. 5A. As another example, if an input is received indicating presence of hail or snow, the controller may control actuators 306, 310 to place the solar panel array in the position depicted in FIG. 5C.

Figure 6:
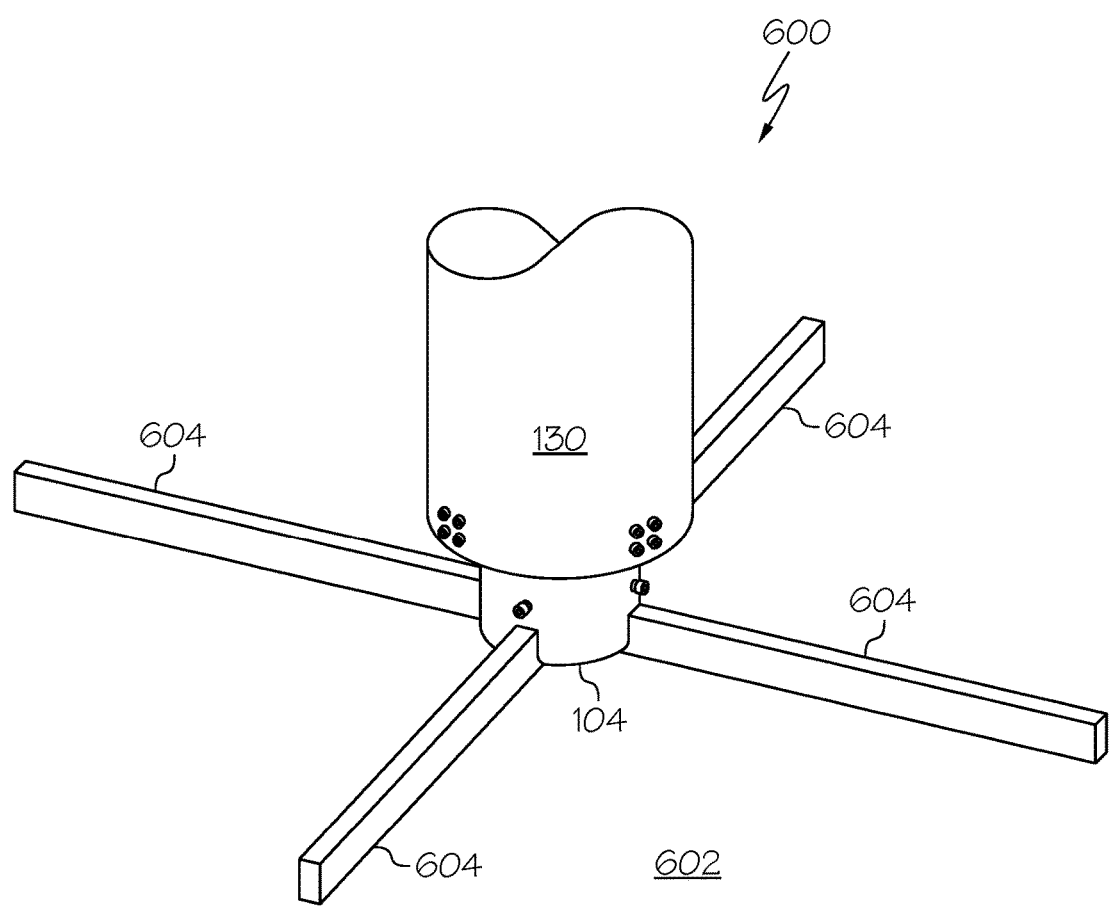
FIG. 6 depicts a stand for an above-ground load support system in accordance with one embodiment.

FIG. 6 depicts an alternative above-ground embodiment of a load support system 600 in which the first portion 114 of elongate support member 104 is omitted, and elongate support member 104 is instead supported on top of a substrate 602 (which may be, for example, earth surface 120) by a stand coupled to elongate support member 104. In the example given in FIG. 6, the stand is formed of multiple legs 604 coupled to elongate support member 104. Other than the modification in the manner in which elongate support member 104 is supported, load support system 600 can be implemented as described with reference to FIGS. 1 to 5C.

As has been described, in at least one embodiment, a load support system includes an elongate support member that includes, toward a first end, a first portion for direct earth burial and further includes, toward a second end, a second portion to which the load can be coupled. A lateral support, mounted about the first portion has a diameter greater than the elongate support member and a length less than the first portion. At least one first helix is formed about the first portion. In some embodiments, the load support system may have a load positioning system including a housing that supports attachment of the load. The housing is sized to receive therein a second helix formed about the second portion of the elongate support member and includes a follower assembly configured to contact the second helix to impart rotation as the housing is raised and lowered. The load positioning system further includes an actuator configured to telescopically raise and lower the housing and/or to rotate the load relative to the housing.

Although embodiments have been described in which the load is a solar panel array, it should be appreciated that the inventions disclosed herein can be utilized with any desired load. In some alternative embodiments, that load can be a solar concentrator, solar collector, solar reflector, antenna or directional signage.

Embodiments of the disclosed load support system can be rugged, can exhibit an elegant design including only a small number of discrete parts, and can be installed and/or serviced by a small crew without requiring specialized tools or training. In at least some embodiments, manufacturing, servicing and installing the load support system is facilitated by utilizing redundant and/or interchangeable parts. For example, housing 130 and lateral support 122 can be formed of the same diameter of pipe, and actuators 306, 310 can be identical. In addition, in some embodiments, load 106 can be mounted in the reverse orientation by making fixture 132 symmetrical about the vertical axis, as shown in FIG. 3 (pivot pin 312 would simply be inserted in the corresponding holes on the other side of fixture 132 in order to pivot in the opposite direction).

While the present invention has been particularly shown as described with reference to one or more preferred embodiments, it will be understood by those skilled in the art that various changes in form and detail may be made therein without departing from the spirit and scope of the invention. The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A load support system, comprising:
an elongate support member having a first diameter, a first end, and a second end, wherein the elongate support member includes, closer to the first end than the second end, a first portion for direct earth burial and further includes, closer to the second end than the first end, a second portion to which a load can be coupled, wherein the first portion has a first length, and wherein the elongate support member further includes:
an interior cavity that is within the elongate support member and that extends from the first portion to the second portion;
a sidewall having an exterior surface, wherein the sidewall has a through hole in the first portion that communicates between the exterior surface and the interior cavity and that is spaced from the second portion by at least 18 inches;

a lateral support having a second diameter greater than the first diameter and a second length less than the first length, wherein the lateral support is mounted about the first portion of the elongate support member between the through hole and the first end, wherein the lateral support includes a first end, a second end, and a sidewall defining an interior volume, and wherein each of the first and second ends of the lateral support has a respective opening therein configured to permit passage of spoils between the interior volume of the lateral support and an exterior of the lateral support; and a helix that is formed about the first portion of the elongate support member and that couples the lateral support to the elongate support member.

2. The load support system of claim 1, wherein the lateral support is substantially concentric with the elongate support member.

3. The load support system of claim 1, wherein each of the elongate support member and the lateral support is tubular and has a substantially circular cross-section.

4. The load support system of claim 3, wherein a ratio of the first diameter to the second diameter is in a range of 0.1 to 0.7.

5. The load support system of claim 1, wherein the first end of the elongate support member includes at least one earth-engaging feature.

6. The load support system of claim 1, wherein:
the helix is a first helix; and
the load support system further comprises a second helix coupled to the first portion of the elongate support member intermediate the lateral support and the first end.

7. The load support system of claim 1, and further comprising a wiring harness disposed in the interior cavity of the elongate support member and extending between the through hole and second portion.

8. A load support system, comprising:
an elongate support member having a first diameter, a first end, and a second end, wherein the elongate support member includes, closer to the first end than the second end, a first portion for direct earth burial and further includes, closer to the second end than the first end, a second portion to which a load can be coupled, wherein the first portion has a first length;
a lateral support having a second diameter greater than the first diameter and a second length less than the first length, wherein the lateral support is mounted about the first portion of the elongate support member;
a first helix that is formed about the first portion of the elongate support member and that couples the lateral support to the elongate support member;
a load positioning system coupled to the second portion of the elongate support member, wherein the load positioning system includes:
a second helix formed about the second portion of the elongate support member;
a housing that surrounds the second portion of the elongate support member and that is configured for attachment of the load thereto, the housing including a follower assembly that contacts the second helix to impart rotation to the housing as the housing is raised and lowered; and
an actuator coupled to the elongate support member and to the housing and configured to telescopically raise and lower the housing relative to the elongate support member.

9. A load positioning system, comprising:
a housing configured for attachment of a load thereto, wherein the housing has an axis and an interior volume sized to receive therein a helix formed about a co-axial elongate support member, and wherein the housing includes a follower assembly configured to contact the helix to impart rotation about the axis to the housing as the housing is raised and lowered along the axis with respect to the elongate support member; and
an actuator having a first end coupled to the housing by a first coupling and a second end configured to be coupled to the elongate support member by a second coupling, wherein the actuator is configured to telescopically raise and lower the housing along the axis relative to the elongate support member, and wherein:
one of the first and second couplings is a rotatable mechanical coupling that is rotatable about the axis;
the first coupling fixes the first end of the actuator with respect to the housing such that the first end of the actuator and the housing move in tandem along the axis; and
the second coupling is configured to fix the second end of the actuator along the axis with respect to the elongate support member.

10. The load positioning system of claim 9, and further comprising the elongate support member and the helix.

11. The load positioning system of claim 10, wherein the helix has at least 180 degrees of rotation.

12. The load positioning system of claim 11, wherein the helix has at least 360 degrees of rotation.

13. The load positioning system of claim 9, wherein:
the housing is a pivotally coupled to the load;
the actuator is a first actuator; and
the load positioning system further includes a second actuator operable independently from the first actuator, wherein the second actuator is coupled to the housing and configured to be coupled to the load such that the load is selectively pivoted with respect to the housing when power is applied to the second actuator.

14. The load positioning system of claim 9, wherein the housing has an access port formed therein through which the second coupling can be accessed.

15. The load positioning system of claim 9, and further comprising a control unit that selectively applies power to the actuator to cause the actuator to move the housing relative to the elongate support member.

16. The load positioning system of claim 9, and further comprising a fixture configured to mechanically connect the load to the housing, wherein the fixture includes multiple symmetrically arranged mounting points for the load.

17. The load positioning system of claim 9, and further comprising the load mechanically attached to the housing.

18. The load positioning system of claim 9, wherein:
the housing has a first end and a second end;
the first coupling couples the first end of the actuator to the first end of the housing; and
the second coupling is the rotatable coupling.

19. The load positioning system of claim 18, and further comprising:
the elongate support member and the helix;

wherein:
the elongate support member is received in the housing; and the second coupling is disposed within the elongate member between the first and second ends of the housing.

20. The load positioning system of claim 19, wherein the housing has an access port formed therein through which the second coupling can be accessed.

21. The load positioning system of claim 9, and further comprising:
a plurality of roller bearings disposed within the interior volume of the housing to maintain spacing between the housing and the elongate support member by exerting force orthogonal to the axis.

22. A load positioning system, comprising:
a housing configured for attachment of a load thereto, wherein the housing has an axis and an interior volume sized to receive therein a helix formed about a co-axial elongate support member having an exterior surface, and wherein the housing includes:
a follower assembly configured to contact the helix to impart rotation to the housing as the housing is raised and lowered;
a plurality of roller bearings disposed within the interior volume and configured to make rolling contact with the exterior surface of the elongate support member along the axis to maintain spacing between the housing and the elongate support member; and
an actuator coupled to the housing and configured to be coupled to the elongate support member, wherein the actuator is configured to telescopically raise and lower the housing relative to the elongate support member.

23. A load support system, comprising:
an elongate support member having a first diameter and a first end and a second end, wherein the elongate support member includes, closer to the first end than the second end, a first portion for direct earth burial and further includes, closer to the second end than the first end, a second portion to which a load can be coupled, wherein the first portion has a first length;
a lateral support having a second diameter greater than the first diameter and a second length less than the first length, wherein the lateral support is mounted about the first portion of the elongate support member;
a first helix formed about the first portion of the elongate support member;
a second helix formed about the second portion of the elongate support member;
a load positioning system, including:
a housing configured for attachment of the load thereto, wherein the housing has an interior volume sized to receive therein the second helix formed about the second portion of the elongate support member, and wherein the housing includes a follower assembly configured to contact the second helix to impart rotation to the housing as the housing is raised and lowered; and
an actuator coupled to the housing and to elongate support member, wherein the actuator is configured to telescopically raise and lower the housing relative to the elongate support member.

24. The load support system of claim 23, and further comprising a control unit that selectively applies power to the actuator.

* * * * *